United States Patent [19]

Ravussin

[11] 4,031,755
[45] June 28, 1977

[54] TRI DIMENSIONAL FLUID FLOW SENSING DEVICE

[75] Inventor: Pierre Ravussin, Lausanne, Switzerland

[73] Assignee: Alcyon Electronique et Physique S.A., Renens, Switzerland

[22] Filed: June 30, 1976

[21] Appl. No.: 701,454

[52] U.S. Cl. .................................................. 73/189
[51] Int. Cl.² ........................................ G01W 1/02
[58] Field of Search ................... 73/189, 188, 170 A

[56] References Cited

UNITED STATES PATENTS

| | | | |
|---|---|---|---|
| 2,959,052 | 11/1960 | Alexander et al. | 73/189 |
| 3,381,529 | 5/1968 | Martin et al. | 73/189 |
| 3,695,103 | 10/1972 | Olson | 73/189 |

Primary Examiner—James J. Gill
Assistant Examiner—Anthony V. Ciarlante
Attorney, Agent, or Firm—Griffin, Branigan and Butler

[57] ABSTRACT

A fluid flow sensing instrument is described which in its specific embodiment comprises an anemometer. Three sensor bearing arms are provided, all at the same azimuth. Three components of the fluid flow are thus simultaneously detected. By having the arms at the same azimuth greater precision is obtained in measuring both the direction and intensity of the fluid vector than with instruments having their sensors in a standard cartesian arrangement. The instrument is thus better adapted to suit the requirements of environmental studies concerning the atmosphere.

6 Claims, 7 Drawing Figures

TRI DIMENSIONAL FLUID FLOW SENSING DEVICE

BACKGROUND OF THE INVENTION

In the development of fluid flow measuring apparatus instruments are sought which will assure ever greater precision. To this end there have been developed tri dimensional fluid flow sensing devices in which separate sensing means are provided for each component of the vector which would represent normally the overall fluid flow.

This type of development has been of some considerable importance in respect of environmental studies particularly concerned with air pollution. Herein has been required the use of a precise anemometer which would be capable of recording very small air velocities and as well the fluctuations both in strength and direction of these. To this end tri dimensional anemometers have already been proposed in which sensing means are separately mounted in supporting arms which are arranged in accordance with the rectangular cartesian coordinate system. The usual arrangement is to provide one arm labelled N pointing in the north direction, another arm labelled E pointing in the east direction and a third arm labelled Z pointing vertically. Each arm may carry at its end a sensing instrument such for example as a propeller or a hot wire sensor. Each sensing means thus is responsive more or less to a single component of the fluid flow (in this case air flow) intended to be measured.

The output from the three sensing means each of which will represent one component of the vector of the fluid flow, is transmitted to a suitable instrument whereby analysis may be carried out, preferably through electronic means. A complete explanation of one known system will be found in British Pat. No. 1,238,041.

It has now been found that although many of the errors which may come into consideration in measurements of this nature may be, at least partially, corrected through electronic means in the analysing apparatus, a better precision in the basic measuring process may be obtained through a different arrangement of the arms carrying the measuring means. Thus, it has been determined that in the standard cartesian arrangement as shown by the prior art the several propellers do not show a responsiveness which can be considered rigorously cosinusoidal. This failure brings about errors both as to the intensity of the air flow and as well its direction. In the great majority of applications of the known system the wind is essentially horizontal with a minor vertical component. The standard cartesian arrangement provokes a maximum error as to the horizontal wind and a considerable uncertainty as to the vertical component of the wind. The present invention provides a novel disposition of the arms carrying the sensing means and thereby seeks to avoid the difficulties of the known prior art.

SUMMARY OF THE INVENTION

The invention accordingly provides an instrument for sensing the components of a vector representing fluid flow and comprises a first, a second and a third arm each bearing fluid flow sensing means, said arms extending from a common origin in directions each of which is at the same angle of inclination from the direction nominally orthogonal to the fluid flow direction.

In the embodiment described hereinafter the instrument in question is an anemometer and the detailed description will be limited to such an instrument. Nevertheless, it would appear likely that the principles set forth would be equally applicable to other fluid flow measuring arrangements.

In the specific embodiment in which the sensing means comprise propellers it has been found furthermore useful to provide the arms carrying the propellers with different lengths whereby the wake from the several propellers does not disturb the oncoming fluid vector in attacking one of the other propellers.

DETAILED DESCRIPTION OF THE INVENTION

Figure 1:
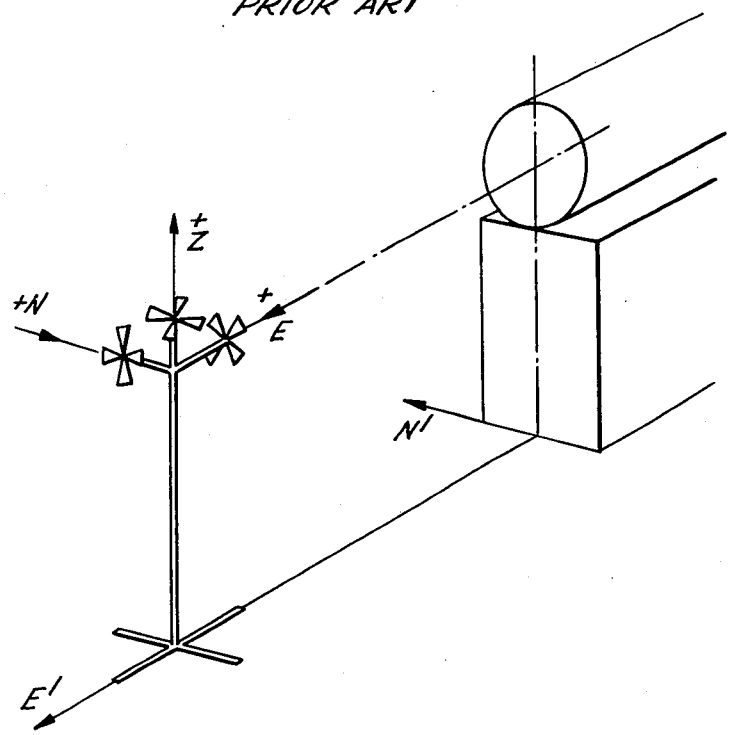
FIG. 1 shows an anemometer installation set up to measure a fluid flow and shows the disposition according to the prior art.
Figure 2:
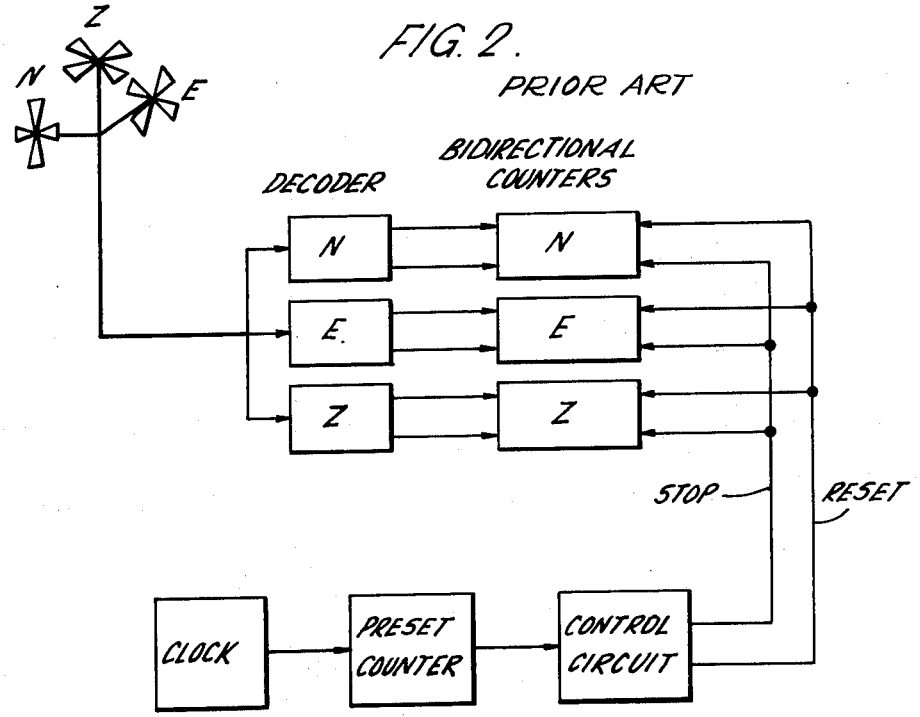
FIG. 2 is similar to FIG. 1 but shows some particulars of the circuits which would follow the known type of tri dimensional anemometer.

In FIG. 1 and 2 are shown typical system arrangements for measuring the velocity of an air flow using as measuring instrument the arrangement known in the prior art in which the three arms N, E and Z are arranged according to the axes of a rectangular cartesian coordinate system. In FIG. 1 the anemometer is shown arranged to measure air flow coming from a duct shown to the right of the instrument. In FIG. 2 there is shown an arrangement still utilizing the anemometer arrangement of the prior art and for which one possible decoding system is shown.

It will be realized that from the propeller sensors of the anemometer, pulse type signals are generated which may be accomplished by an arrangement as shown in the British patent previously referred to. After decoding, the signals coming from the three branches of the anemometer may be passed into individual bidirectional counters NEZ. Such counters are controlled from a clock, a preset counter and a control circuit which permits stopping and resetting at desired intervals. The number of pulses counted during a given interval from each of the three sensors will give an indication of the strength of the vector components and may be subsequently combined to represent the overall fluid flow strength and direction. It will of course be realized that many different systems are possible for capturing and analysing the data as provided from the anemometer of the invention. It will also be realized that what has so far been shown concerns mainly the prior art which with certain modifications may be adapted to the present invention.

Figure 3:
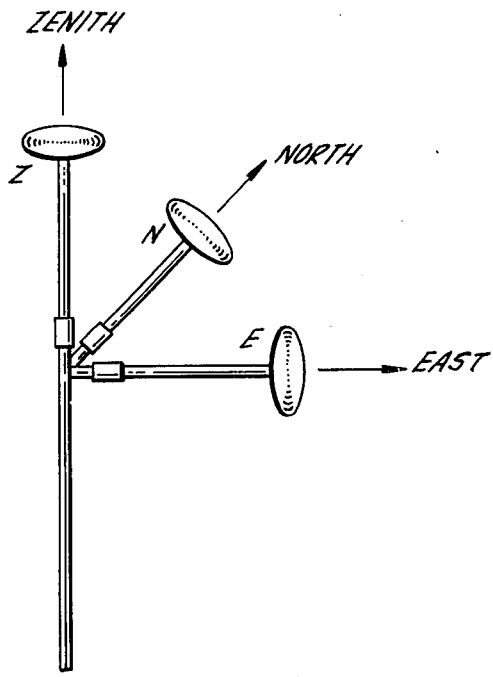
FIG. 3 is an enlarged view showing the anemometer head only, still according to the prior art disposition.
Figure 4:
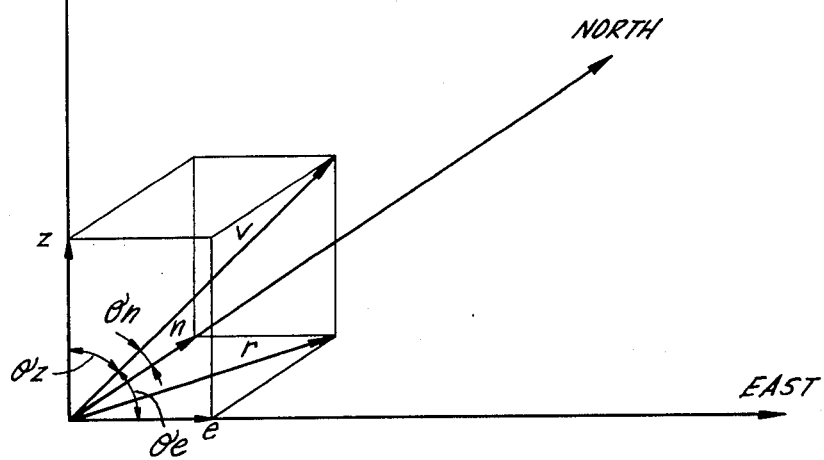
FIG. 4 is a vector diagram showing how the several components are combined to give a resultant or alternatively how the original vector is resolved into its several components the diagram showing the standard cartesian arrangement.
Figure 5A:
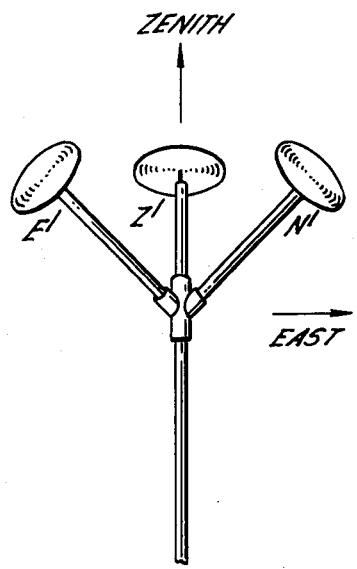
FIG. 5 A,B,C show the invention as to the new disposition of the anemometer head, 5 A is a side view and 5 B is a side view at 90° to FIG. 5 A 5 C is a top plan view.
Figure 5B:
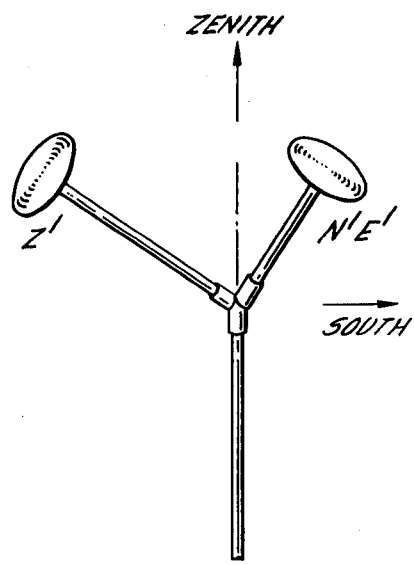
Figure 5C:
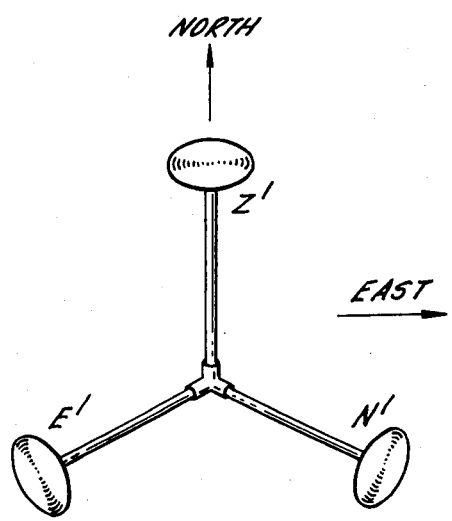

FIG. 3 is an enlarged view of the anemometer, still of the prior art, and may be used to understand more readily the present invention. In FIG. 3 there is shown an anemometer NEZ arranged according to the cartesian coordinate axes. The force of each of the fluid flow components as measured by the three arms N, E and Z will vary according to the direction cosine of the air flow vector as related to the three cartesian axes NEZ. Thus, if as shown in FIG. 4 V represents the air flow direction and velocity then the three components will be respectively $N = V\cos\theta_n, E = V\cos\theta_e, Z = V\cos\theta_z$. It has been found by experience that the response is not strictly according to the cosines of the vector with respect to the three coordinate axes and to improve the performance in this respect the disposition as set forth in FIGS. 5 A, B and C has now been adopted in the present invention. Herein it will be realized that there are as in the prior art arrangements three arms respectively N', E', and Z' and such arms are arranged so as to show an equal angle of inclination from the direction nominally orthogonal to the fluid flow direction. In a typical set up such direction will be vertical since normally the fluid flow may be expected to proceed horizontally. In such instance this type of tri dimensional anemometer may be considered as having an equal azimuth for each of the sensing arms. To simplify calculations and analysis in the present example the three arms N', E', Z' may be considered to be orthogonal to one another although it is not strictly necessary in practice that they should so be arranged. However, to the extent that they are mounted orthogonal to one another it will be clear that they may be considered in the same manner as an ijk system of unit vectors wherein the resultant will having a nominal length relative to the three components ijk equal to $\sqrt{3}$. Accordingly, the angle between the resultant and each of these components will be arc cos $\sqrt{(1/3)}$. This angle as shown in FIG. 5 B will measure out to 54.74°. It will be equally clear that the three arms when mapped onto a plane passing through the common origin and parallel to the fluid flow direction will be separated from one another by equal angles of 120°.

To perform the necessary calculations to convert from data obtained by the invention according to FIGS. 5 A, B and C it will be convenient to consider this arrangement relative to a standard cartesian set of coordinates. Accordingly, the original form as shown in FIG. 3 will be considered as the coordinate base to which will be referred forms as shown respectively in FIGS. 5 A, B and C.

With the arms N', E', Z' as shown to best advantage in FIG. 5 A and 5 C arranged in an orthogonal fashion it will be clear that the coordinates of arm N' when referred to a standard set of coordinates such as shown in FIG. 3 will be readily determined when one considers that the length of each arm N', E', Z' will be one unit and the resultant which will be vertical is equal to $\sqrt{3}$. Moreover, as already noted the angle between the vertical and the three arms will be equal to arc cos $\sqrt{(1/3)}$. It then becomes clear that the projected length of the arms N', E', Z' onto a horizontal plane will be equivalent to $\sqrt{(2/3)}$.

The coordinates then of arms N', E', Z' referred to FIG. 3 are as follows:

| | N | E | Z |
|---|---|---|---|
| N' | $-\sqrt{\frac{2}{3}}\cos 60°$ | $\sqrt{\frac{2}{3}}\cos 30°$ | $\sqrt{\frac{1}{3}}$ |
| E' | $-\sqrt{\frac{2}{3}}\cos 60°$ | $-\sqrt{\frac{2}{3}}\cos 30°$ | $\sqrt{\frac{1}{3}}$ |
| Z' | $\sqrt{\frac{2}{3}}$ | 0 | $\sqrt{\frac{1}{3}}$ |

The foregoing set of coordinates N', E', Z' referred to the original set NEZ following reduction of the cosine terms may be written in the form of a matrix $$\begin{Vmatrix} -\sqrt{\frac{1}{6}} & \sqrt{\frac{1}{2}} & \sqrt{\frac{1}{3}} \\ -\sqrt{\frac{1}{6}} & -\sqrt{\frac{1}{2}} & \sqrt{\frac{1}{3}} \\ \sqrt{\frac{2}{3}} & 0 & \sqrt{\frac{1}{3}} \end{Vmatrix}$$

Thereafter, when it is desired to convert the data obtained from the construction according to FIGS. 5 A, B, and C to a standard cartesian frame of reference it is merely necessary to multiply the data by a matrix A obtained simply by interchanging the rows and the columns of the matrix herein above. Thus, matrix A equals:

$$\|A\| = \begin{Vmatrix} -\sqrt{\frac{1}{6}} & -\sqrt{\frac{1}{6}} & \sqrt{\frac{2}{3}} \\ \sqrt{\frac{1}{2}} & -\sqrt{\frac{1}{2}} & 0 \\ \sqrt{\frac{1}{3}} & \sqrt{\frac{1}{3}} & \sqrt{\frac{1}{3}} \end{Vmatrix}$$

It is thus apparent that the data referred to the original cartesian coordinates is converted as hereinafter shown:

$$N = -\sqrt{\frac{1}{6}} N' - \sqrt{\frac{1}{6}} E' + \sqrt{\frac{2}{3}} Z'$$

$$E = +\sqrt{\frac{1}{2}} N' - \sqrt{\frac{1}{2}} E'$$

$$Z = +\sqrt{\frac{1}{3}} N' + \sqrt{\frac{1}{3}} E' + \sqrt{\frac{1}{3}} Z'$$

Where propellers are used as sensing elements it has been found further desirable to provide arms of different lengths whereby the downstream side of each propeller will not provide a wake interfering with the current hitting the adjacent propellers. The different lengths may be established empirically or experimentally if so desired, the principle being that the distance at which the wake effect is produced should be sufficient to avoid an adjacent propeller. The different length of arm is most visible for instance as shown in FIG. 5 B. It will of course be realized that where a different type of sensor is utilized, for example a hot wire, there would probably be little or no reason to make the arms of different length.

With the anemometer of the present invention it has been found that the precision of the instrument is considerably improved over the arrangement utilizing the arms in a cartesian formation and thus it has been found that such precision passes from ± 10.5% to ± 4.6% for the intensity of the horizontal fluid flow and from ± 5° to ± 4° for the direction of the horizontal fluid flow prior to correction. The fact that the arms may have different lengths has provided a further gain in precision which may improve to ± 3% for the horizontal force and to ±2° for the horizontal direction.

Although as may readily be determined from their coordinates, the arms as shown in FIG. 5 are orthogonal to one another, such is not essential. Should a different angle be chosen it is evident that the values in the transformation matrix would change. It is considered essential for the improved performance achieved that the angle between each of the arms and the vertical direction be the same where, in the case of an anemometer, the vertical direction is substantially orthogonal to the fluid flow direction.

What we claim is:

1. An instrument for sensing the components of a vector repesenting fluid flow comprising a first, a second and a third arm each bearing fluid flow sensing propeller means, said arms extending from a common origin in directions each of which is at the same angle of inclination from the direction nominally orthogonal to the fluid flow direction and means for measuring said vecotr components.

2. An instrument as set forth in claim 1 wherein the fluid flow direction is basically horizontal and the orthogonal direction is vertical.

3. An instrument as set forth in claim 2 wherein the fluid comprises air said instrument constituting an anemometer.

4. An instrument as set forth in claim 1 wherein the angle of inclination equals arc cos $\sqrt{(1/3)}$.

5. An instrument as set forth in claim 1 wherein the arms when mapped onto a plane passing through the common origin and parallel to the fluid flow direction are separated from one another by equal angles of 120°.

6. An instrument as set forth in claim 1 wherein each arm is of a length different from the other arms.

* * * * *